(12) United States Patent
Zheng et al.

(10) Patent No.: US 11,498,453 B2
(45) Date of Patent: Nov. 15, 2022

(54) EQUALIZING DEVICE FOR VEHICLE SOFT-PACKED BATTERY AND EQUALIZING METHOD FOR SOFT-PACKED BATTERY

(71) Applicant: UNIVERSITY OF SHANGHAI FOR SCIENCE AND TECHNOLOGY, Shanghai (CN)

(72) Inventors: Yuejiu Zheng, Shanghai (CN); Wei Yi, Shanghai (CN); Hang Wu, Shanghai (CN); Long Zhou, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/299,796

(22) PCT Filed: Jul. 3, 2020

(86) PCT No.: PCT/CN2020/100282
§ 371 (c)(1),
(2) Date: Jun. 4, 2021

(87) PCT Pub. No.: WO2021/243793
PCT Pub. Date: Dec. 19, 2021

(65) Prior Publication Data
US 2022/0212562 A1 Jul. 7, 2022

(30) Foreign Application Priority Data
Jun. 2, 2020 (CN) .......................... 202010497401.8

(51) Int. Cl.
*H02J 7/00* (2006.01)
*B60L 58/13* (2019.01)
*H01M 10/058* (2010.01)

(52) U.S. Cl.
CPC ........... *B60L 58/13* (2019.02); *H01M 10/058* (2013.01); *H02J 7/0014* (2013.01); *H02J 7/0025* (2020.01); *H01M 2220/20* (2013.01)

(58) Field of Classification Search
CPC ...................................................... B60L 58/13
(Continued)

(56) References Cited

U.S. PATENT DOCUMENTS

| 2010/0194339 A1* | 8/2010 | Yang | H02J 7/0016 320/116 |
| 2013/0300373 A1* | 11/2013 | Vivanco-Sarabia | H02J 7/0014 320/134 |

(Continued)

FOREIGN PATENT DOCUMENTS

| CN | 101847882 A | 9/2010 |
| CN | 103198936 A | 7/2013 |

(Continued)

OTHER PUBLICATIONS

International Search Report in PCT/CN2020/100282, issued by ISA, dated Feb. 25, 2021.
(Continued)

*Primary Examiner* — Yalkew Fantu
(74) *Attorney, Agent, or Firm* — Zhu Lehnhoff LLP

(57) ABSTRACT

The invention provides an equalizing device for a vehicle soft-packed battery and an equalizing method for the soft-packed battery. According to the equalizing method for the vehicle soft-packed battery, a battery to be equalized is connected to a parallel equalization circuit by using an equalizing device for a vehicle soft-packed battery, battery cells to be equalized are sequentially equalized by adopting a first-in first-out sequence, and the SOC of each cell equalized is maintained within a preset range; and the number of the cells entering the equalizing device for the
(Continued)

vehicle soft-packed battery is N, and the equalizing time of the battery cells is T. The equalizing device for the vehicle soft-packed battery comprises a holder clamping type or a copper sheet compressing type. On the premise of remarkably improving the equalizing efficiency of the battery cell, the invention can reduce the space and cost required by the equalizing operation, and ensure that the SOC difference of the equalized battery cell is maintained within a certain range, and it is a low-cost high-efficiency battery cell equalizing device. The invention is suitable for equalizing a large number of battery cells on a production line.

9 Claims, 9 Drawing Sheets

(58) Field of Classification Search
USPC .......................................................... 320/134
See application file for complete search history.

(56) References Cited

U.S. PATENT DOCUMENTS

| 2016/0344203 A1* | 11/2016 | Poirier | B60L 58/22 |
| 2017/0214239 A1* | 7/2017 | Dutra | H02J 7/0031 |

FOREIGN PATENT DOCUMENTS

| CN | 107069096 A | 8/2017 |
| CN | 107370202 A | 11/2017 |
| CN | 207303248 U | 5/2018 |
| CN | 110086220 A | 8/2019 |
| WO | 2012143396 A1 | 10/2012 |

OTHER PUBLICATIONS

Written Opinion of the International Search Report in PCT/CN2020/100282, issued by ISA, dated Feb. 25, 2021.

* cited by examiner

EQUALIZING DEVICE FOR VEHICLE SOFT-PACKED BATTERY AND EQUALIZING METHOD FOR SOFT-PACKED BATTERY

TECHNICAL FIELD

The invention relates to the field of power batteries of electric vehicle or hybrid electric vehicle, in particular to an equalizing device for a vehicle soft-packed battery and an equalizing method for the vehicle soft-packed battery.

BACKGROUND

Along with the increasingly aggravation of the world energy crisis, people enjoy the convenience brought by the automobile industry, and also urgently need to find a new alternative energy to alleviate the crisis of traditional energy. At the same time, electric and hybrid electric vehicle are favored by more and more manufacturers because of their excellent performance in many complex new energy vehicles. The lithium battery has the advantages of high energy density, power density, no memory and the like, so that the lithium battery becomes the first choice of the vehicle power battery. The voltage and capacity of the single batteries are limited not to meet the requirements of vehicle power batteries, and the single batteries must be connected into groups in series and in parallel-series connection. The practice shows that the life span of the battery pack is much lower than that of the single battery after the single batteries being connected into groups, which is caused by the inconsistency of the battery pack. In order to improve the service life and performance of the battery pack, it is necessary to improve the consistency of the batteries in the battery pack. The evaluation indexes of consistency include SOC, internal resistance, capacity, coulomb efficiency, decay rate and self-discharge rate. The SOC, internal resistance and capacity are referred to as state quantities, and the coulomb efficiency, decay rate and self-discharge rate are referred to as cumulated quantities. The consistency of state quantities guaranteed is called pseudo-consistency, and the consistency of state quantities tends to be inconsistent over time accumulation. According to the capacity evolution mechanism of the battery pack in series, guaranteeing the consistency of cumulated quantities, that is, ensuring the consistency of decay rate, coulomb efficiency and self-discharge rate, is the key to improve the consistency of the battery pack for a long time. However, it is difficult to ensure the consistency of decay rate and coulomb efficiency. At present, there is no good way to sort batteries by the decay rate and the coulomb efficiency. The self-discharge rate of the lithium battery refers to the phenomenon of spontaneous loss of battery capacity in an open circuit state. The batteries can thus be sorted by observing the extent to which the capacity of the battery is lost over a period of time. The self-discharge phenomenon exists more or less in each battery cell, and SOC and OCV attenuation rates of each battery are different due to different power loss caused by self-discharge difference before the cells to be sorted are connected into a sorting device. Sorting circuits are connected in parallel, and equalization can be carried out spontaneously in different circuits of the battery SOC. Therefore, when a battery cell with a larger self-discharge rate exists in the battery cell connected to the sorting circuit, extremely small self-equalizing current can be observed in a parallel branch to flow to a battery cell with a large self-discharge rate. The cells to be sorted must be equalized in parallel in order to ensure that the self-equalizing current observed in the parallel branch is caused by the SOC difference due to the cell with the large self-discharge rate after being connected to the sorting circuit, and not caused by the initial SOC difference of each cell. In addition, it is necessary to ensure that the SOC difference of the equalized battery cell can be controlled within a small range. In order to achieve rapid equalization of a large number of batteries, a device capable of simultaneously achieving equalization of the large number of batteries is required.

SUMMARY OF THE INVENTION

The invention is directed to provide an equalizing device for a vehicle soft-packed battery and an equalizing method for the soft-packed battery, wherein the battery to be equalized enters the device from an equalizing inlet for equalization, with finished equalization after passing through an equalizing outlet after about 3 hours, and the equalized battery cell can be applied to sorting based on the relative self-discharge rate of the battery. The device can greatly improve the sorting efficiency, shorten the sorting time and simultaneously sort a large number of batteries.

In order to achieve the above object, the technical solution adopted by the invention is as follows: according to an equalizing method for a vehicle soft-packed battery, a battery to be equalized is connected to a parallel equalization circuit by using an equalizing device for a vehicle soft-packed battery, battery cells to be equalized are sequentially equalized by adopting a first-in first-out sequence, and the SOC of each cell equalized is maintained within a preset range; and the number of the cells entering the equalizing device for the vehicle soft-packed battery is N, and the equalizing time of the battery cells is T.

According to the equalizing method for the vehicle soft-packed battery provided by the invention, in an initial equalizing stage, the battery cells are sequentially connected to the equalizing device for the vehicle soft-packed battery to be placed for 3 hours, and then the equalizing device is started; and by adopting a flow equalization mode after the initial equalization, an unequalized battery cell is put into an equalization inlet immediately after the equalization of one battery cell is completed.

According to the equalizing method for the vehicle soft-packed battery, the equalizing device for the vehicle soft-packed battery is a holder clamping type or a copper sheet compressing type.

The equalizing device for the vehicle soft-packed battery for use in the equalizing method comprises an annular conveying device, a cell holding device and an unloading control device;

the annular conveying device comprises two transmission gears and an annular conveying belt arranged on the transmission gears;

the cell holding device comprises a cell loading trolley arranged on the annular conveying belt, a cell holder arranged on the cell loading trolley, and a positive and negative tab support arranged on the cell loading trolley; and the unloading control device comprises a roller mounted on the cell holder, a guide rail arranged on a base, and an unloading recess arranged on the base and located on a moving track of the cell loading trolley.

Further, the cell loading trolley is connected to the annular conveying belt by a connecting boss, and the cell loading trolley can rotate upwards and downwards relative to the connecting boss.

Further, the cell holder comprises:
a holder base;

two straight pull rods of the holder arranged on the holder base, wherein a cross pull rod of the holder is mounted between the two straight pull rods of the holder, a lifting arm of the holder is arranged at one end of the cross pull rod of the holder, a rectangular arm of the holder is arranged at a waist of the straight pull rod of the holder connected with the other end of the cross pull rod of the holder, and a pressing sheet of the holder and a pressing plate of the holder are arranged on the rectangular arm of the holder by a pressing rod of the holder; and a roller is arranged at a free end of the lifting arm of the holder.

An equalizing device for a vehicle soft-packed battery for use in the equalizing method comprises an annular conveying device and a base for fixing a battery cell;

the annular conveying device comprises two drums and an annular conveying belt arranged on the drums; and the base for fixing the battery cell comprises a connecting boss arranged on the annular conveying belt and copper plates of positive and negative poles of the battery cell.

Compared with the prior art, the invention has the advantages that on the premise of remarkably improving the equalizing efficiency of the battery cell, the invention can reduce the space and cost required by the equalizing operation, and ensure that the SOC difference of the equalized battery cell is maintained within a certain range, and it is a low-cost high-efficiency battery cell equalizing device. The invention is suitable for equalizing a large number of battery cells on a production line.

DETAILED DESCRIPTION OF THE INVENTION

The technical solution adopted by the invention will be further described with reference to the schematic drawings.

Figure 1:
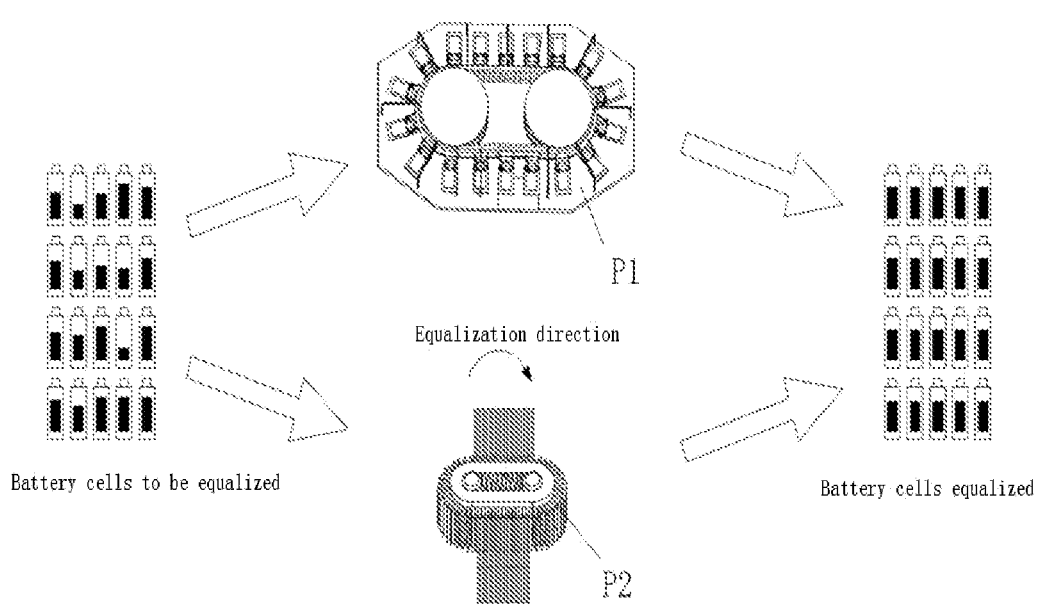
FIG. 1 is a workflow chart of an equalizing method for a vehicle soft-packed battery according to a first embodiment of the present invention.

First embodiment of the invention provides an equalizing method for a vehicle soft-packed battery, and a flow chart of the method is shown in FIG. 1. A certain number of soft-packed batteries just leaving from a factory are randomly selected as experimental objects, equalizing operations are sequentially performed on the batteries by adopting a first-in first-out equalizing sequence, and it should be noted that during the equalization:

(1) when performing the equalization for the first time, the battery cells should be connected in sequence to a parallel equalizing device and placed for 3 hours before starting the equalizing device to ensure that the first batch of battery cells participating in the equalization are fully equalized;

(2) meanwhile, the number of the cells participating in the equalization cannot be less than 720, the equalizing time of each cell is about 3 hours, and each cell enters and exits for every 15 seconds;

(3) according to two configurations designed by the invention, a first configuration P1 is suitable for equalizing a medium-batch of battery cells (corresponding to the equalizing device for the vehicle soft-packed battery provided in the second embodiment), and a second configuration P2 is suitable for equalizing a large-batch of battery cells (corresponding to the equalizing device for the vehicle soft-packed battery provided in the third embodiment).

A second embodiment of the present invention provides an equalizing device for a vehicle soft-packed battery suitable for the first embodiment, the device is a holder clamping type, as seen in FIGS. 2-7, and the device comprises an annular conveying device 4, 12, a cell holding device 9, 10, 16, 17 and an unloading control device 7, 8, 21. The annular conveying device 4, 12 comprises two transmission gears 4 and an annular conveying belt 12 arranged on the transmission gears, the annular conveying device 4, 12 has a base 6 at which the annular conveying device 4, 12 is mounted, and an I-shaped rib 5 is arranged at the base 6 for fixing a fixed guide rail 8 to the base 6. A positive pole connected main circuit 14 of the parallel equalization circuit and a negative pole connected main circuit of 15 of the parallel equalization circuit are mounted on the annular conveying belt 12.

Figure 3:
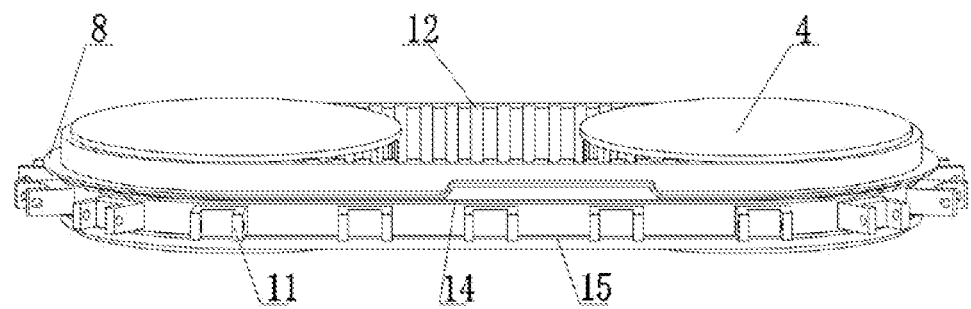
FIG. 3 is a schematic view of a transmission system of the equalizing device for the vehicle soft-packed battery according to the second embodiment of the present invention.

The cell holding device 9, 10, 16, 17 comprises a cell loading trolley 10 arranged on the annular conveying belt, a cell holder 9 arranged on the cell loading trolley, and a positive and negative tab support (comprising a cell tab negative pole support 16 and a cell tab positive pole support 17) arranged on the cell loading trolley. The cell loading trolley is provided with a loading trolley wheel 18 which is mounted at the bottom of one end of the cell loading trolley 10 via a wheel bearing 19 of the loading trolley and a wheel shaft 20 of the loading trolley. The cell loading trolley 10 is connected to the annular conveying belt 12 by a connecting boss 11, and the cell loading trolley 10 can rotate upwards and downwards relative to the connecting boss 11, as seen in FIG. 3; and the connecting boss 11 is a U-shaped block body, two side lugs of the connecting boss are provided with coaxial openings, and the cell loading trolley is provided with axial lugs mounted at the openings of the side lugs of the connecting boss, so that the cell loading trolley can rotate upwards and downwards along the axial lug.

The unloading control device 7, 8, 21 comprises a roller 21 mounted on the cell holder 9, a guide rail 8 arranged on the base 6, and an unloading recess 7 arranged on an annular conveying belt mounting table (i.e. the base 6), wherein the roller can be a roller mounted on a free end of a lifting arm of the holder, and the unloading recess is located on a moving track of the cell loading trolley. In the embodiment, referring to FIG. 2, the unloading recess 7 is located in the middle of a straight section of the annular conveying belt mounting table. The unloading recess is a square concave part, and inclined guide surfaces are arranged on left side and right sides of the square concave part, so that the wheels of the cell loading trolley can walk conveniently.

Figure 2:
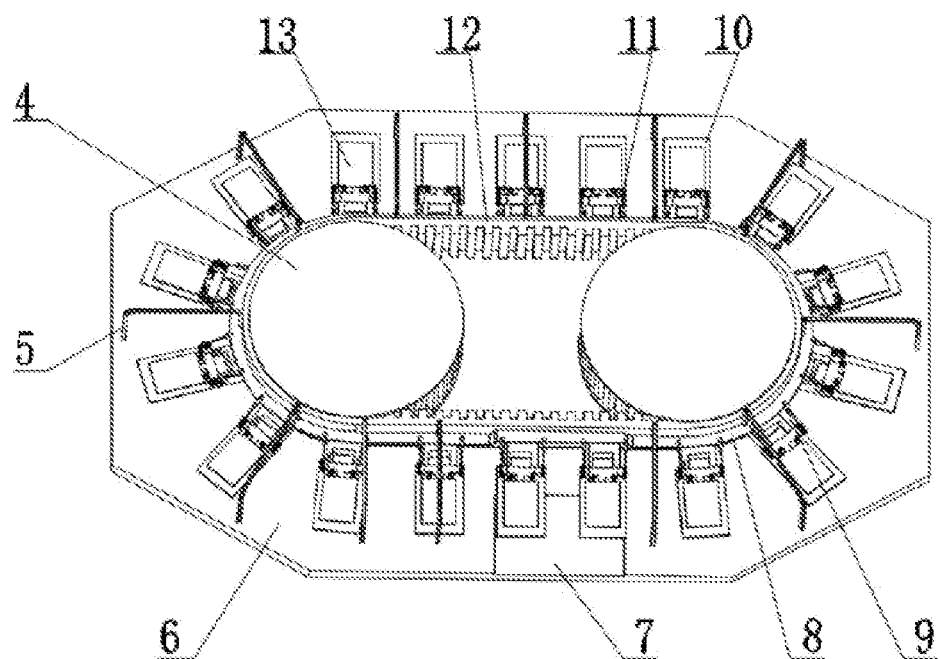
FIG. 2 is a general assembly view of an equalizing device for a vehicle soft-packed battery according to a second embodiment of the present invention.

FIG. 2 shows a soft-packed battery cell 13 located on the cell loading trolley 10. In FIGS. 2-3, the power of the equalizing device for the vehicle soft-packed battery is transmitted from two power gears 4 to the annular conveying belt 12, and then to the cell loading trolley 10 via the connecting boss 11 mounted on the annular conveying belt 12, so that the cell loading trolley 10 moves. When the cell loading trolley 10 moves to the unloading recess 7, the cell holder 9 is loosened, and the cell loading trolley 10 rolls over downwards relative to the connecting boss 11, so that the battery cell 13 smoothly slide down to finish the equalization; further, after the loading trolley 10 passes through the unloading recess 7, the battery cells to be equalized are clamped by the cell holder 9, and the battery cells are connected into the parallel equalization circuit.

Figure 4:
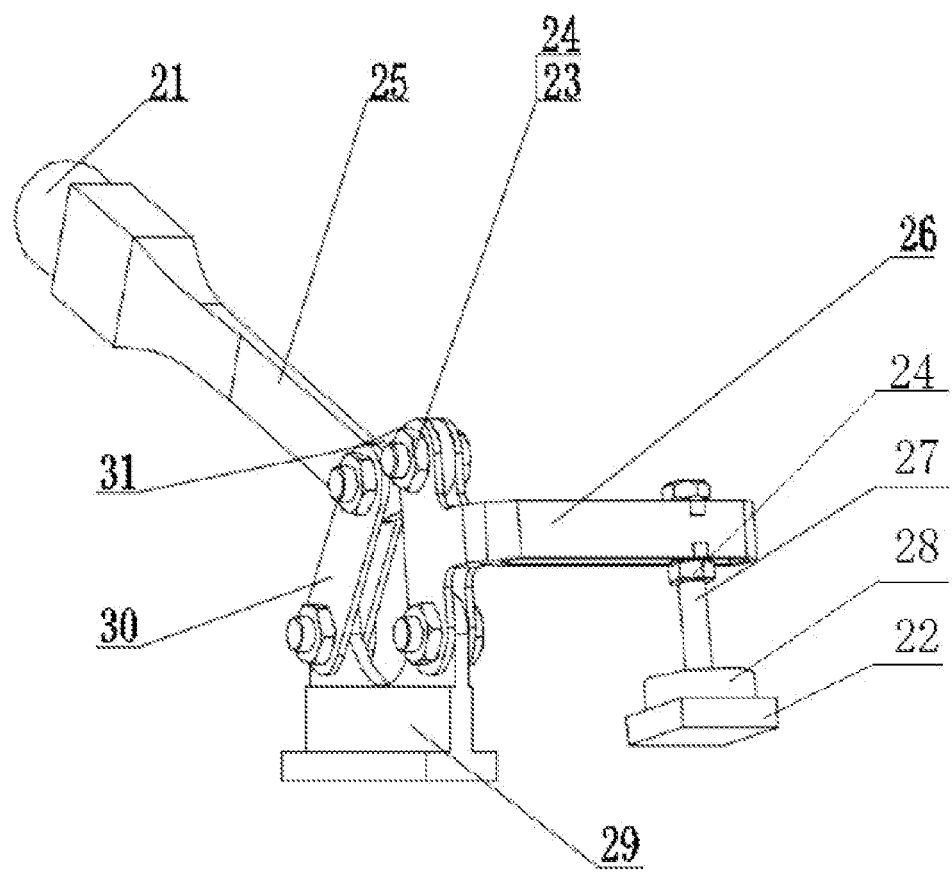
FIG. 4 is a schematic view of a cell holder of the equalizing device for the vehicle soft-packed battery according to the second embodiment of the present invention.

Referring to FIG. 4, the cell holder 9 comprises a holder base 29 arranged on a cell loading trolley 10, wherein two straight pull rods 30 of the holder are mounted on the holder base, the bottoms of the two straight pull rods of the holder are fixed on the holder base by holder bolts 23 and holder nuts 24, a cross pull rod 31 of the holder is mounted between the two straight pull rods of the holder, and both ends of the cross pull rod 31 of the holder are respectively connected to the top of the straight pull rod 30 of the holder by the clamp bolts 23 and the holder nuts 24. A lifting arm 25 of the holder is mounted at one end of the cross pull rod 31 of the holder, a rectangular arm 26 of the holder is arranged at a waist of the straight pull rod 30 of the holder connected with the other end of the cross pull rod 31, a holder pressing sheet 28 and a holder pressing plate 22 are mounted on the rectangular arm 26 of the holder by a pressing rod 27 of the holder, the pressing rod 27 of the holder adopts a screw structure, and a holder nut 24 is mounted at the position where the screw passes through the rectangular arm 26 of the holder. A roller 21 is arranged at the free end of the lifting arm 25 of the holder. When the lifting arm 25 of the holder moves downwards, the pressing plate of the holder moves downwards, and the holder is clamped; and when the lifting arm 25 of the holder moves upwards, the pressing sheet of the holder moves upwards, and the cell holder 9 is released. In the present device, the compressing and releasing of the cell holder 9 are controlled by the guide rail 8 mounted on the base and the roller 21 mounted on the cell holder 9.

Figure 5:
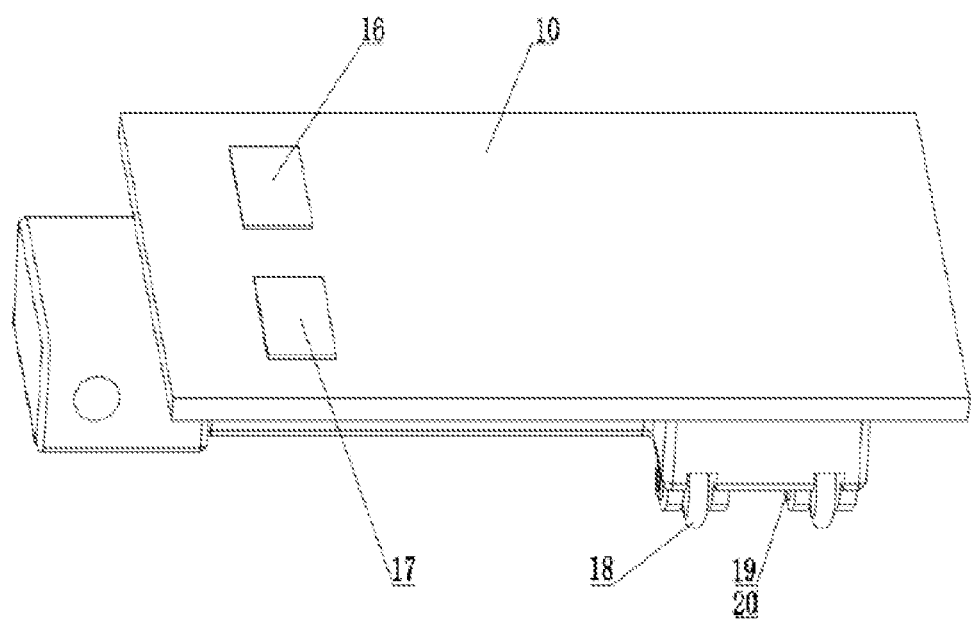
FIG. 5 is a schematic view of a loading trolley of the equalizing device for the vehicle soft-packed battery according to the second embodiment of the present invention.

Referring to FIG. 5, the cell loading trolley 10 is provided with a cell tab negative pole support 16, a cell tab positive pole support 17, a loading trolley wheel 18, a wheel bearing 19 of the loading trolley and a wheel shaft 20 of the loading trolley. The cell tab negative pole support 16 and the cell tab positive pole support 17 are respectively connected by wires with a positive pole connected main circuit 14 of parallel equalization circuit and a negative pole connected main circuit of 15 of the parallel equalization circuit which are arranged on the annular conveying belt 12; and the battery cell is connected to the parallel equalization branch after the soft-packed battery cell 13 is compressed on the cell loading trolley by the cell holder 9.

Figure 6:
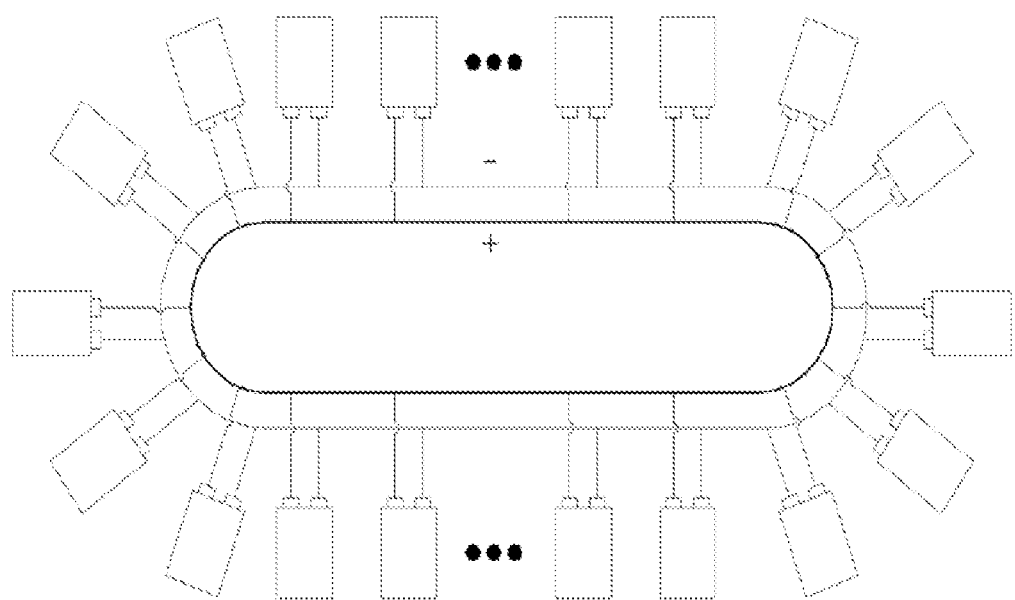
FIG. 6 is an electrical connection diagram of a parallel equalization circuit of the equalizing device for the vehicle soft-packed battery according to the second embodiment of the present invention.

With reference to FIG. 6, after the soft-packed battery cells 13 are connected to an equalizing device for the vehicle soft-packed battery (an equalizing device for the soft-packed battery cell entering and exiting), a passive equalizing mode is performed for the battery cells, and the positive and negative pole tabs of each battery cell are respectively connected in parallel to realize the equalization of the electric quantity of each battery cell. After the soft-packed battery cell 13 is connected to the device, the equalization is considered to be completed after about 3 hours. In principle, the number of battery cells connected to the device is not limited, the equalization of a large number of battery cells can be carried out simultaneously, and the equalization time is not changed due to the number of connected battery cells.

Figure 7:
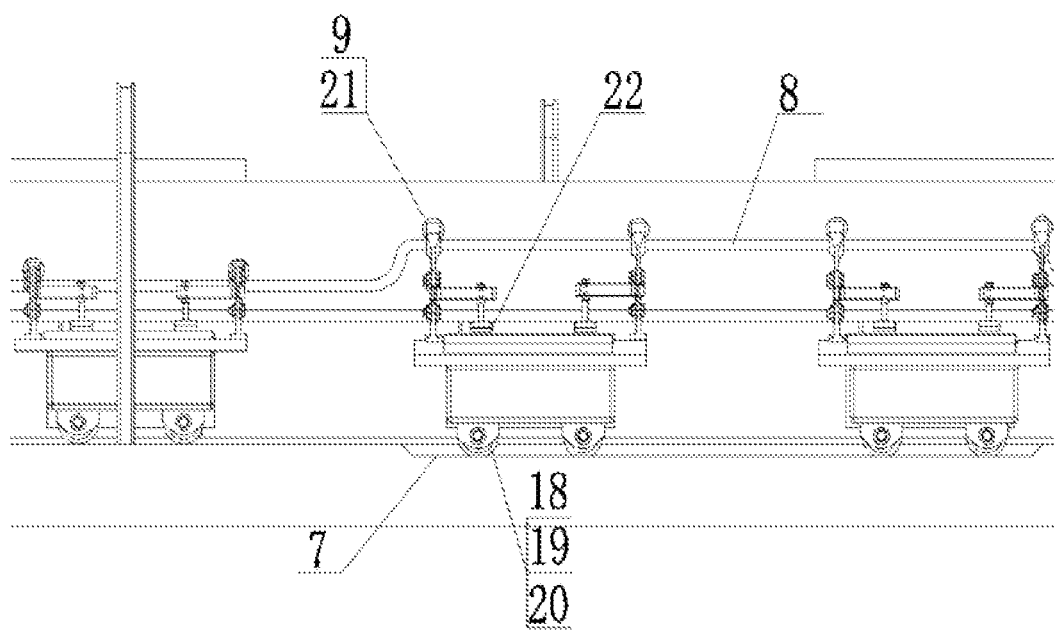
FIG. 7 is a schematic view showing a battery cell unloading operation of the equalizing device for the vehicle soft-packed battery according to the second embodiment of the present invention.

As can be seen from FIG. 7, cell holders 9 are symmetrically mounted to a cell loading cart 10. When a roller 21 moves to the front of an unloading recess 7, the position of the roller 21 is lower, and the holder is in a compressed state; when the roller 21 moves to the unloading recess 7, the roller 21 moves to a higher position along the guide rail 8, and at this time the cell holder 9 is in a released state due to the upward movement of a lifting arm 25 of the holder with the roller 21.

The third embodiment of the present invention provides an equalizing device for a vehicular soft-packed battery suitable for the first embodiment, which is a copper sheet compressing type. Compared with the equalizing device for the vehicle soft-packed battery provided by the second embodiment, the equalizing device for the vehicle soft-packed battery provided by the embodiment of the invention is simpler to disassemble, can equalize two batches of battery cells at a time, and occupies less space.

Figure 8:
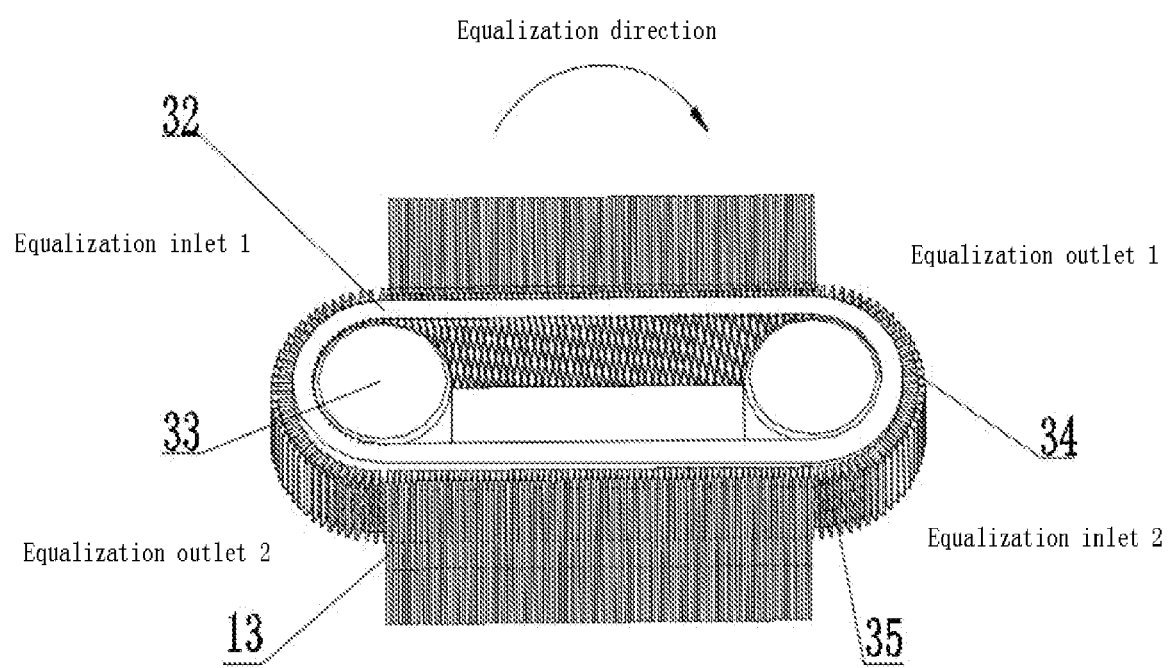
FIG. 8 is a general assembly view of an equalizing device for a vehicle soft-packed battery according to a third embodiment of the present invention.
Figure 9:
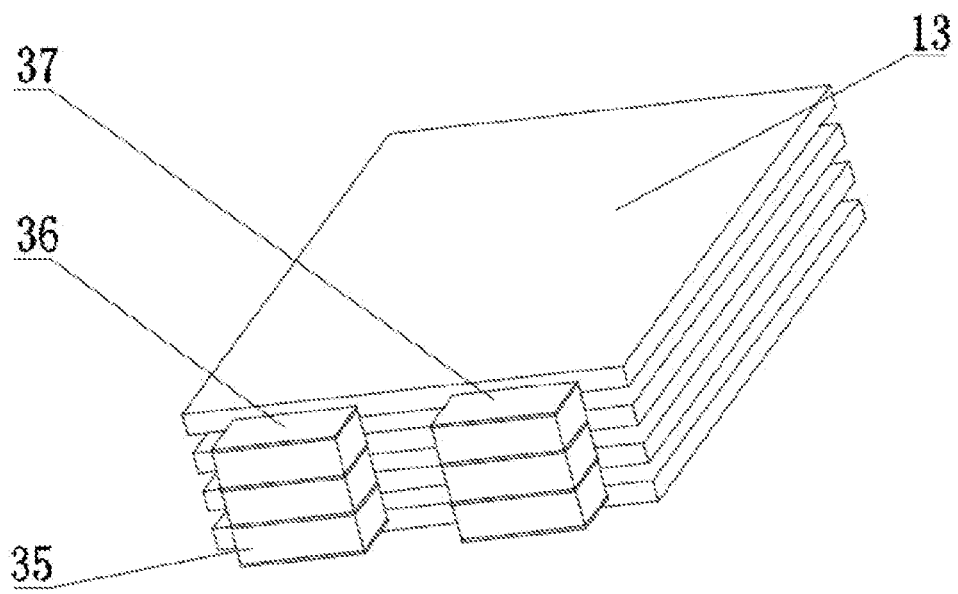
FIG. 9 is an electrical connection diagram of a parallel equalization circuit of the equalizing device for the vehicle soft-packed battery according to the third embodiment of the present invention.

Referring to FIGS. 8-9, the vehicle flexible battery equalizing device comprises an annular conveying device 4, 12 and a base for fixing a battery cell. The annular conveying device 4, 12 comprises two drums 33, an annular conveying belt 32 mounted to the drums.

Figure 10:
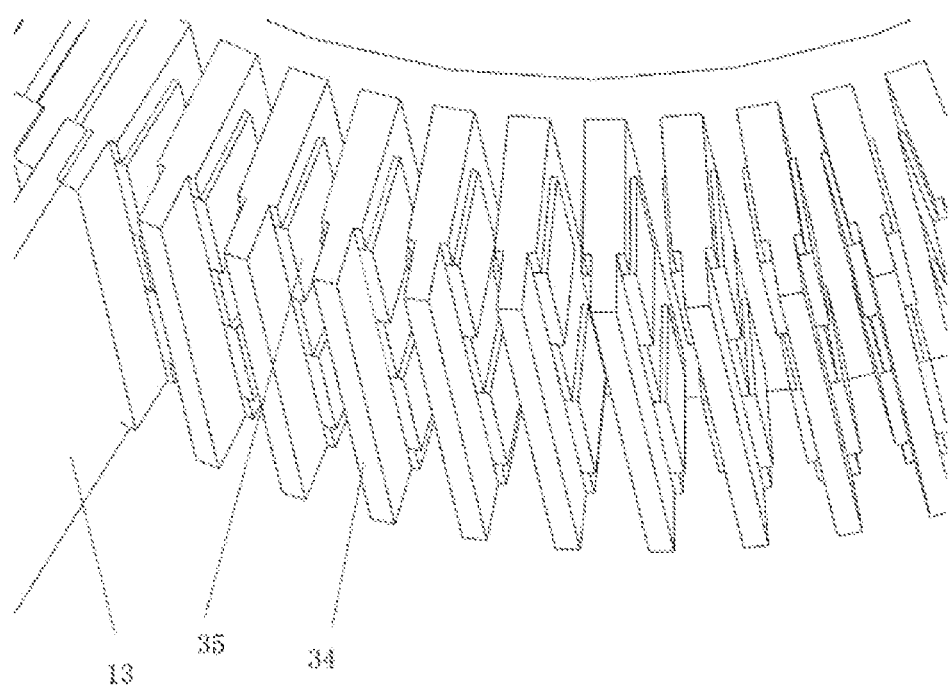
FIG. 10 is a partial enlarged view of the equalizing device for the vehicle soft-packed battery according to the third embodiment of the present invention.

The base for fixing the battery cell comprises a connecting boss 34 arranged on the annular conveying belt and copper plates 35 of positive and negative poles of the battery cell, wherein a plurality of connecting bosses 34 are arranged with the annular conveying belt 32, the soft-packed battery cells can be arranged through gaps between the connecting bosses; as seen in FIG. 10, the front ends of the two connecting bosses are provided with a recess structure, the recess structure enables the soft-packed battery cell to be positioned, and the copper plates 35 of positive and negative poles of the battery cell are arranged at the tail end of the recess structure.

There are two equalizing outlets and inlets according to the equalizing direction of the battery cell. If the soft-packed battery cell 13 enters from the equalizing inlet 1 for equalizing and ends the equalizing from the equalizing outlet 1, and if the soft-packed battery cell 13 enters from the equalizing inlet 2 for equalizing and ends the equalizing from the equalizing outlet 2. When the soft-packed battery cells 13 move to the vicinity of the cylindrical drum 33, the annular conveying belt 32 is stretched, and the distance between the connecting bosses 34 mounted on the annular conveying belt 32 is increased, and the soft-packed battery cells 13 fixed on the annular conveying belt 32 can be smoothly removed; when the soft-packed battery cells 13 are far away from the cylindrical roller 33, the annular conveying belt 32 is not stretched any more, the distance between the connecting bosses 34 mounted on the annular conveying belt 32 is reduced, and the copper plates 35 of positive and negative poles of the battery cell mounted on the annular conveying belt 32 are driven to compress the soft-packed battery cell 13.

Referring to FIG. 9, when the soft-packed battery cell 13 is compressed, the positive and negative pole tabs 36 and 37 of the battery cell respectively contact with the copper plates 35 of positive and negative poles of the battery cell to form a parallel equalization circuit, and a certain number of the soft-packed battery cells 13 must be ensured to be in an equalization state at the same time during the equalization, so that the battery cells with large SOC difference possibly existing to affect the equalization effect can be diluted.

The above-mentioned are only preferred embodiments of the invention and not intended to limit the invention in any way. Any person skilled in the art, without departing from the technical solution of the present invention, can make any form of equivalent substitution or modification of the technical solution and the technical content disclosed in the present invention, and still fall within the scope of protection of the present invention without departing from the technical solution of the present invention.

The invention claimed is:

1. An equalizing device for a vehicle soft-packed battery, characterized in that a battery to be equalized is connected to a parallel equalization circuit by using an equalizing device for a vehicle soft-packed battery, battery cells to be equalized are sequentially equalized by adopting a first-in first-out sequence, and an SOC of each cell equalized is maintained within a preset range;
   the number of the cells entering the equalizing device for the vehicle soft-packed battery is N, and an equalizing time of the battery cells is T;
   in an initial equalizing stage, the battery cells are sequentially connected to the equalizing device for the vehicle soft-packed battery to be placed for 3 hours, and then the equalizing device is started;
   by adopting a flow equalization mode after an initial equalization, an unequalized battery cell is put into an equalization inlet immediately after the equalization of one battery cell is completed; and
   the equalizing device for the vehicle soft-packed battery is a holder clamping type or a copper sheet compressing type;
   wherein the equalizing device comprises an annular conveying device, a cell holding device and an unloading control device;
   the annular conveying device comprises two transmission gears and an annular conveying belt arranged on the transmission gears;
   the cell holding device comprises a cell loading trolley arranged on the annular conveying belt, a cell holder arranged on the cell loading trolley, and a positive and negative tab support arranged on the cell loading trolley; and
   the unloading control device comprises a roller mounted on the cell holder, a guide rail arranged on a base, and an unloading recess arranged on the base and located on a moving track of the cell loading trolley.

2. The equalizing device for the vehicle soft-packed battery according to claim 1, characterized in that the cell loading trolley is connected to the annular conveying belt by a connecting boss, and the cell loading trolley can rotate upwards and downwards relative to the connecting boss.

3. The equalizing device for the vehicle soft-packed battery according to claim 1, characterized in that the cell holder comprises:
   a holder base;
   two straight pull rods of the holder arranged on the holder base, wherein a cross pull rod of the holder is mounted between the two straight pull rods of the holder, a lifting arm of the holder is arranged at one end of the cross pull rod of the holder, a rectangular arm of the holder is arranged at a waist of the straight pull rod of the holder connected with the other end of the cross pull rod of the holder, and a pressing sheet of the holder and a pressing plate of the holder are arranged on the rectangular arm of the holder by a pressing rod of the holder; and
   a roller is arranged at a free end of the lifting arm of the holder.

4. An equalizing device for a vehicle soft-packed battery, characterized in that a battery to be equalized is connected to a parallel equalization circuit by using an equalizing device for a vehicle soft-packed battery, battery cells to be equalized are sequentially equalized by adopting a first-in first-out sequence, and an SOC of each cell equalized is maintained within a preset range;
   the number of the cells entering the equalizing device for the vehicle soft-packed battery is N, and an equalizing time of the battery cells is T;
   in an initial equalizing stage, the battery cells are sequentially connected to the equalizing device for the vehicle soft-packed battery to be placed for 3 hours, and then the equalizing device is started; and
   by adopting a flow equalization mode after an initial equalization, an unequalized battery cell is put into an equalization inlet immediately after the equalization of one battery cell is completed;
   wherein the equalizing device comprises an annular conveying device, a cell holding device and an unloading control device;
   the annular conveying device comprises two transmission gears and an annular conveying belt arranged on the transmission gears;
   the cell holding device comprises a cell loading trolley arranged on the annular conveying belt, a cell holder arranged on the cell loading trolley, and a positive and negative tab support arranged on the cell loading trolley; and
   the unloading control device comprises a roller mounted on the cell holder, a guide rail arranged on a base, and an unloading recess arranged on the base and located on a moving track of the cell loading trolley.

5. The equalizing device for the vehicle soft-packed battery according to claim 4, characterized in that the cell loading trolley is connected to the annular conveying belt by a connecting boss, and the cell loading trolley can rotate upwards and downwards relative to the connecting boss.

6. The equalizing device for the vehicle soft-packed battery according to claim 4, characterized in that the cell holder comprises:
   a holder base;
   two straight pull rods of the holder arranged on the holder base, wherein a cross pull rod of the holder is mounted between the two straight pull rods of the holder, a lifting arm of the holder is arranged at one end of the cross pull rod of the holder, a rectangular arm of the holder is arranged at a waist of the straight pull rod of the holder connected with the other end of the cross pull rod of the holder, and a pressing sheet of the holder and a pressing plate of the holder are arranged on the rectangular arm of the holder by a pressing rod of the holder; and a roller is arranged at a free end of the lifting arm of the holder.

7. An equalizing device for a vehicle soft-packed battery, characterized in that a battery to be equalized is connected to a parallel equalization circuit by using an equalizing device for a vehicle soft-packed battery, battery cells to be equalized are sequentially equalized by adopting a first-in first-out sequence, and an SOC of each cell equalized is maintained within a preset range; and the number of the cells entering the equalizing device for the vehicle soft-packed battery is N, and an equalizing time of the battery cells is T;

wherein the equalizing device comprises an annular conveying device, a cell holding device and an unloading control device;

the annular conveying device comprises two transmission gears and an annular conveying belt arranged on the transmission gears;

the cell holding device comprises a cell loading trolley arranged on the annular conveying belt, a cell holder arranged on the cell loading trolley, and a positive and negative tab support arranged on the cell loading trolley; and the unloading control device comprises a roller mounted on the cell holder, a guide rail arranged on a base, and an unloading recess arranged on the base and located on a moving track of the cell loading trolley.

8. The equalizing device for the vehicle soft-packed battery according to claim 7, characterized in that the cell loading trolley is connected to the annular conveying belt by a connecting boss, and the cell loading trolley can rotate upwards and downwards relative to the connecting boss.

9. The equalizing device for the vehicle soft-packed battery according to claim 7, characterized in that the cell holder comprises:

a holder base;

two straight pull rods of the holder arranged on the holder base, wherein a cross pull rod of the holder is mounted between the two straight pull rods of the holder, a lifting arm of the holder is arranged at one end of the cross pull rod of the holder, a rectangular arm of the holder is arranged at a waist of the straight pull rod of the holder connected with the other end of the cross pull rod of the holder, and a pressing sheet of the holder and a pressing plate of the holder are arranged on the rectangular arm of the holder by a pressing rod of the holder; and a roller is arranged at a free end of the lifting arm of the holder.

* * * * *